June 5, 1962 W. N. CHITTENDEN ETAL 3,037,782
SELF-RELEASING COLLET
Filed April 2, 1959
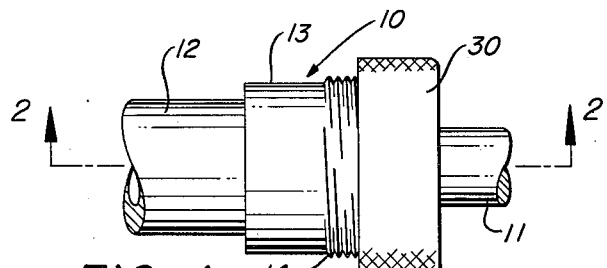
FIG. 1
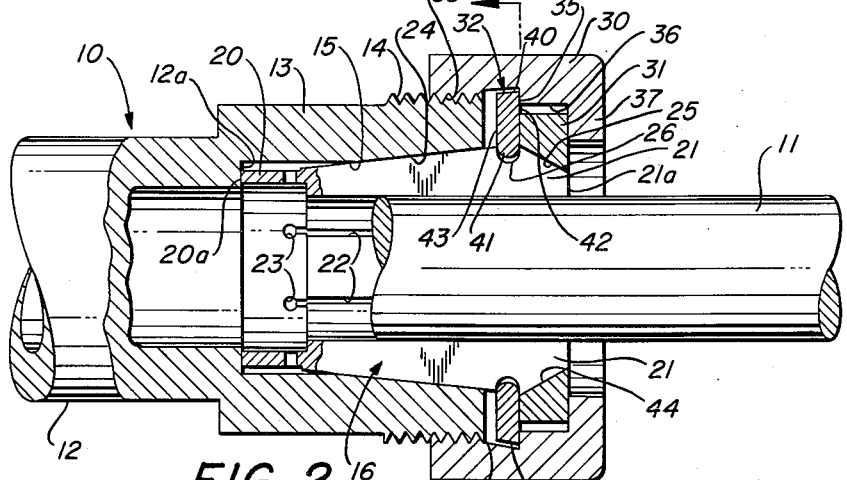
FIG. 2
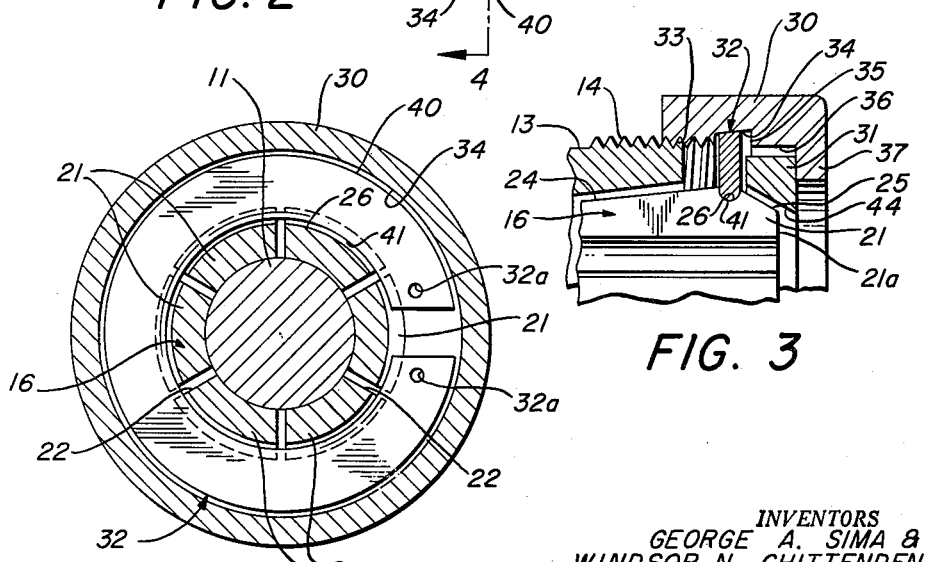
FIG. 3
FIG. 4
INVENTORS
GEORGE A. SIMA &
WINDSOR N. CHITTENDEN
BY
J. William Freeman
ATTORNEY United States Patent Office 3,037,782
Patented June 5, 1962

3,037,782
SELF-RELEASING COLLET
Windsor N. Chittenden, Largo, Fla., and George A. Sima, Macedonia, Ohio, assignors by assignment and decree of distribution of one-half to Howard Cramer and one-half to Florence B. Sima
Filed Apr. 2, 1959, Ser. No. 803,705
9 Claims. (Cl. 279—59)

This invention relates to the art of collets and in particular relates to an improved type of collet, wherein means are provided for effectively removing the collet member from the holder therefor after usage thereof.

In applicants' copending application, Serial No. 689,444, filed October 10, 1957, now Patent No. 2,885,210, there was described an improved combination wherein means were provided for effectively ejecting a collet from the holder therefor after the use of the same had been completed.

In general, the invention of the above captioned application utilized a double tapered collet of the type set forth in Chittenden Patent 2,272,185, and added an ejector ring mechanism that was carried by the compression member and which acted against one tapered surface of the collet to frictionally engage the same and thus cause automatic ejection of the collet from the holder therefor.

More specifically, the ejector ring had an inner peripheral surface that was tapered complemental to the taper of the collet, with the result that when a tool was positioned in the collet, the gripping jaws of the collet would be unable to flex, with the result that the tapered surface of the ejector ring would act against the tapered surface of the collet to cause automatic ejection of the same.

While the above described device has proved satisfactory in the great majority of instances, there are certain difficulties that have been encountered with regard to the same.

First, from a production standpoint, it has been exceedingly difficult to maintain the delicate clearances required to insure perfect mating between the ring and the collet. In instances where the ring is, for example, made slightly oversized, it has been found that the same will slip over the end of the tapered surface of the collet and will, accordingly, not effectuate a releasing movement on the same. In instances where the ring diameter is made too small, difficulty is sometimes encountered in connection with the removal of the collet with respect to the ring member, due to the inability of the gripping jaws to flex the necessary amount.

It has been discovered that the aforementioned disadvantages can be obviated by providing two specific improvements to the combination set forth in applicants' above referred to copending application.

First, it has been found that if the connection or engagement between ring and collet is changed from an engagement between complementally tapered surfaces to a rib and groove type of connection, a definite mechanical interlock will occur to result in a more efficient, axially presented ejecting force.

Secondly, it has been discovered that if the outer perimetric edge surface of the ring is tapered so as to engage a similarly tapered surface provided on the compression member, that the compression member will, in effect, exert a radially contracting force on the ring during axial movement of the compression member relatively thereof, with the result that the ring member will be radially collapsed into tighter engagement with the groove that is provided in the collet member.

It accordingly becomes the principal object of this invention to provide an improved type of self-releasing collet featuring mechanical interlock between the collet and the ejector ring unit associated therewith, with means further being preferably provided for automatically decreasing the effective diameter of the ejector ring upon unseating of the collet.

Other objects of the invention will become more apparent upon a reading of the following brief specification, considered and interpreted in the light of the accompanying drawings.

Of the drawings:
FIGURE 1 is an elevational view of the improved collet chuck.
FIGURE 2 is a sectional view taken on the lines 2—2 of FIGURE 1.
FIGURE 3 is a fragmentary view similar to FIGURE 2, but illustrating the position of the component parts during removal of the collet from the holder therefor.
FIGURE 4 is a view taken on the lines 4—4 of FIGURE 2.

Referring now to the drawings, it will be seen that the improved collet ejecting mechanism, generally designated by the numeral 10, serves to concentrically dispose a tool 11 about the axis of rotation of a machine tool spindle 12, with the collet ejecting mechanism 10 releasably securing the tool 11 in the position shown in FIGURE 1.

Considering first the structure of the machine tool spindle 12, it will be seen that the same includes a head portion 13 of enlarged cylindrical diameter that is externally threaded as at 14 for coaction with the collet ejecting mechanism 10, as will be described. Additionally, the head portion 13 is further provided with a tapering internal socket 15 within which an appropriately contoured collet 16 may be received as clearly shown in FIGURE 2 of the drawings.

Again referring to FIGURE 2 of the drawings, the collet 16 includes a cylindrical base portion 20 from which project a plurality of concentrically disposed gripping jaws 21, 21, with these gripping jaws 21 being disposed in a preferably circular course, as shown in FIGURE 4, for the purpose of encircling the tool 11. It is to be understood that slits 22, 22 are defined by the adjacent jaws 21, 21, with these slits preferably terminating in apertures 23, 23 in the manner set forth in Chittenden Patent 2,272,185.

In addition to the aforementioned structure, the external surface of each of the circularly arranged gripping jaws 21, 21 includes a plurality of axially extending tapered surfaces 24, 24, with these surfaces 24, 24 tapering outwardly from the base 20 and being complementally inclined with respect to the tapered socket 15. In this manner, when the surface 15 engages the surfaces 24, 24, an inward flexing will occur with respect to the gripping jaws 21, 21.

The outer end of each gripping jaw is further preferably defined by a tapered surface 25, with this surface 25 tapering radially outwardly from the end face 21a of each gripping jaw 21. It will be seen particularly from FIGURE 2 that the surfaces 24 and 25 of each gripping body approach each other at what may be considered the maximum diameter point of the collet 16 and in the region of the maximum diameter point, there is shown provided a circumferentially extending undercut 26, with one such undercut 26 being provided on each gripping jaw so as to form a circular course of undercuts within which certain components of the compression member will be received as will hereinafter be described. Additionally, the inboard end face 20a of the base 20 is shown seated against an appropriate shoulder 12a, it being understood that clearance could be provided in this point if determined necessary.

For the purpose of providing an ejection means for unseating the collet 16 with regard to holder 12, the improved collet means 10 further include a compression ring 30, a compensator ring 31, and an ejector ring unit 32, with both the compensator and ejector rings 31 and 32 being associated with the compression member 30, as is clearly shown in the drawings.

Considering first the structure of the compression member 30, it will be seen that the same includes an axially extending internally threaded portion 33 that is designed for threaded engagement with the externally presented threads 14, as clearly shown in FIGURES 2 and 3 of the drawings.

Axially adjacent the just described threaded segment 33 is an axially extending wall section 34 that is illustrated in the preferred embodiment, as tapering radially outwardly at approximately a 15 degree inclination with respect to the axis of rotation thereof. This wall section 34 terminates in a shoulder 35 which, in turn, defines a cylindrical wall surface 36 that, in turn, terminates in a radially inwardly presented end flange 37.

To the end of facilitating coaction between the compression member 30 and collet 16, the ring member 32 has its radially outermost peripheral edge surface 40 preferably tapered with respect to its axis of rotation at approximately the same inclination as the previously described surface 34 of member 30 so as to facilitate sliding engagement therewith when the component parts are moved to the position shown in FIGURE 3 of the drawings.

The inner radial surface 41 of the ring 32 is shown contoured for reception within the undercuts 26, 26 so that the opposed wall surfaces of the undercuts 26, 26 may mechanically interlock with the opposed side walls 42 and 43 of the ring 32, with side wall 42 also bearing against shoulder 35 when the parts are positioned as shown in FIGURE 2.

With reference to the compensator ring 31, the same is of generally cylindrical configuration and includes inner radial wall 44 that is complementally tapered with respect to the wall surface 25 of each gripping jaw 21, with the compensator ring thus serving to center the collet in the holder therefor during the seating of the same. In this regard, it is believed obvious that the opposed axial ends of the ring 31 bear against the ring 32 and the end flange 37 during installation and removal of the collet.

In use or operation of the improved self-releasing collet, it will first be assumed that the compensating ring 31 and ejector ring 32 have been associated with the compression member 30, as shown in FIGURE 2, with ring 32 being preferably of the split type and including apertures 32a, 32a to facilitate insertion in adjacency with the wall section 34 and with ring 31 being held in place between ring 32 and end flange 37.

With the members 30, 31 and 32 having been assembled as just indicated, the collet 16 may be positioned thereon by merely inserting either axial end thereof through the ring 32 and causing collapse of the gripping jaws 21, 21 to the point where the same snap outwardly when the undercuts 26, 26 are registered with the ring 32, with this subassembly of parts 30, 31, 32 and 16 being clearly shown in FIGURE 2.

At this time, the collet may be inserted with respect to the holder 12 by merely causing engagement between threads 33 and 14 and upon further tightening movement, it is believed apparent that the compensator ring 31 will bear against surface 25 to cause firm and secure fitting of the collet 16 within socket 15, with axial alignment being insured by the use of the compensator ring just described. Also in this instance, some increment of seating force will be supplied by the shoulder 35 acting against axial end face 42 of ring 32.

Prior to complete seating of the collet and radial collapse thereof by virtue of the contracting force offered by the compensating ring 31, it is to be understood that the tool 11 will have been inserted and, accordingly, as the compression member 31 is further advanced to the left towards the position of FIGURE 2, the gripping jaws 21, 21 will be radially collapsed in concentric alignment to properly position the tool 11 within the holder 12, with this condition of firm gripping being fully shown in FIGURE 2.

When it is desired to remove the collet, it is merely necessary that the member 30 be rotated in the opposite direction so as to cause movement thereof to the right of FIGURE 2 and towards the position of FIGURE 3. During this movement, the complementally tapered surfaces 34 and 40 will engage to insure retention of the ring 32 within the grooves 26. In the preferred form, the taper will be such that some radial collapse of the ring wil occur during such unseating, with the ring 32 being shown in a somewhat radially collapsed condition in FIGURE 3 of the drawings. Continued unscrewing of the compression member 30 will result in complete unseating of the collet 16 with respect to holder 12 due to the mechanical interlock of ring 32 within undercuts or grooves 26, 26. When the collet has been removed from the holder 12, the tool 11 may be easily removed therefrom at which time an axial pull may be exerted on one end of the collet to cause radial collapse of the gripping jaws 21, 21 and thus permit removal of the collet 16 with respect to ring 32.

It will be seen from the foregoing that there has been provided a new and novel type of improved self-releasing collet featuring the automatic ejection of the collet due to the mechanical interlock between the collet and parts that move relatively of the holder for the collet.

It has been further shown how continuance of this mechanical interlock is insured during removal by the provision of means for automatically decreasing the diameter of the ejector ring so as to insure continued mechanical interlock between this ring and the collet that is being ejected.

While a full and complete disclosure of the invention has been set forth in accordance with the dictates of the Patent Statutes, it is not intended that the invention be so limited.

Thus, while the preferred embodiment of the invention contemplates the use of steel for the component parts described, it is to be understood that the steel could be provided with greater or lesser degrees of resiliency so as to effectuate the desired results illustrated herein.

Similarly, while certain specific shapes and contours have been shown for the purposes of illustration, it is to be understood that the invention contemplates the use of equivalent contours for effectuating like functions.

Accordingly, modifications of the invention may be resorted to without departing from the spirit hereof or the scope of the appended claims.

This application is a continuation-in-part of copending application, Serial No. 689,444, filed October 10, 1957, now patent No. 2,885,210.

What is claimed is:

1. In combination with a tool holder having a tapered socket at one end thereof, within which is seated a projecting collet having radially outwardly tapering surfaces that converge towards a maximum diameter for said collet, with said tapered surfaces including a socket engaging surface, an outer tapered surface and an undercut provided at the juncture of said socket engaging and said outer surfaces and defining at least one wall surface that extends radially inwardly adjacent said maximum diameter point; a compression member shiftably carried by said tool holder and being engageable with said outer tapered surface of said collet to press the same into said socket upon relative axial movement of said compression member relatively of said tool holder and towards said socket; a ring carried by said compression member and being receivable in said undercut; said ring having a base that is parallel to and abuts said radial wall, whereby said collet may be unseated from said socket upon movement of said compression member away from said socket.

2. A compression ring for use on an externally threaded tool holder that has a tapering socket at one end thereof, within which is received a radially collapsible collet having a tapered socket engaging surface, a tapering outer surface that has one axial end thereof joining with an axial end of said tapered socket surface towards a maximum diameter point for said collet, with an undercut being provided in the region of said maximum diameter point and defining a wall surface that extends radially inwardly adjacent said maximum diameter point, comprising; a tubular section having an axially extending internal wall section that is threaded adjacent one axial end thereof for engagement with said external threads of said tool holder; a compression surface defined by one axial end of said tubular section and being adapted to engage said outer tapered surface, whereby said collet may be pressed into said socket upon rotation of said tubular section on said tool holder; and a projecting ring member concentrically carried by and extending radially inwardly of said internal wall section and defining a radially innermost edge portion adapted to be received in said undercut, said ring having a face that is parallel to and abuts said radial wall surface, whereby said collet may be unseated upon unthreading of said tubular section relatively of said tool holder.

3. The device of claim 2 further characterized by the fact that said ring member is shiftable axially of said internal wall surface through a limited axial path of movement.

4. The device of claim 3 further characterized by the fact that said radially outermost surface of said ring and said internal wall surface are complementally tapered with respect to the axis of rotation of said ring, whereby said compression ring will radially collapse said projecting ring upon relative axial movement therebetween.

5. A collet chuck mechanism of the character described, comprising; a tool holder adapted to cooperate with a machine tool and having a tapered socket in one end thereof; a collet insertable in said socket and formed with a plurality of gripping jaws adapted to receive a tool therein and flexing inwardly as said collet is pressed into said socket; with the external surfaces of said gripping jaws defining a pair of radially outwardly tapering surfaces that converge towards a maximum diameter point for said collet; at least one wall surface defined by an undercut provided in the external surface of said gripping jaws adjacent said maximum diameter point thereof; said wall surface extending substantially radially inwardly from a point adjacent said maximum diameter point; a compression member shiftable axially of said tool member in opposed directions; said compression member seating said collet in said socket upon axial shifting towards said socket; a ring member projecting radially inwardly of said compression member and being movable therewith relatively of said holder during axial shifting of said compression member; said ring member having its inner edge portion received within said undercut when a tool is received in said jaws, with a face of said ring abutting against said radial wall during axial shifting of said compression member away from said socket, whereby the engagement of said ring with said wall will unseat said collet from said socket during shifting of said compression member.

6. A collet chuck mechanism of the character described, comprising; a tool holder adapted to cooperate with a machine tool and having a tapered socket in one end thereof; a collet insertable in said socket and formed with a plurality of gripping jaws adapted to receive a tool therein and flexing inwardly as said collet is pressed into said socket; with the external surfaces of said gripping jaws defining a pair of radially outwardly tapering surfaces that converge towards a maximum diameter point for said collet; at least one wall surface defined by an undercut provided in the external surface of said gripping jaws adjacent said maximum diameter point thereof; said wall surface extending substantially radially inwardly from a point adjacent said maximum diameter point; a compression member shiftable axially of said tool member in opposed directions; said compression member seating said collet in said socket upon axial shifting towards said socket; a ring member projecting radially inwardly of said compression member and being movable therewith relatively of said holder during axial shifting of said compression member; said ring member having its inner edge portion received within said undercut when a tool is received in said jaws, with a face of said ring abutting against said radial wall during axial shifting of said compression member away from said socket, whereby the engagement of said ring with said wall will unseat said collet from said socket during shifting of said compression member; said ring member being radially flexible in diameter.

7. The device of claim 6 further characterized by the fact that said ring is movable relatively of said compression member through a limited path of axial movement.

8. The device of claim 7 further characterized by the fact that said ring is radially collapsed during axial movement relatively of said compression member, whereby said inner edge portion is positioned in fuller contact with said radial wall.

9. A collet chuck mechanism of the character described, comprising; a tool holder adapted to cooperate with a machine tool and having a tapered socket in one end thereof; a collet insertable in said socket and formed with a plurality of gripping jaws adapted to receive a tool therein and flexing inwardly as said collet is pressed into said socket; with the external surfaces of said gripping jaws defining a pair of radially outwardly tapering surfaces that converge towards a maximum diameter point for said collet; at least one wall surface defined by an undercut provided in the external surface of said gripping jaws adjacent said maximum diameter point thereof; said wall surface extending substantially radially inwardly from a point adjacent said maximum diameter point; a compression member shiftable axially of said tool member in opposed directions; said compression member seating said collet in said socket upon axial shifting towards said socket; a ring member projecting radially inwardly of said compression member and being movable therewith relatively of said holder during axial shifting of said compression member; said ring member having its inner edge portion received within said undercut when a tool is received in said jaws, with a face of said ring abutting against said radial wall during axial shifting of said compression member away from said socket, whereby the engagement of said ring with said wall will unseat said collet from said socket during shifting of said compression member; said ring being radially flexible and being radially collapsed towards fuller contact with said radial wall.

References Cited in the file of this patent

UNITED STATES PATENTS

| | | |
|---|---|---|
| 1,952,109 | Woodward | Mar. 27, 1934 |
| 2,449,887 | Edel | Sept. 21, 1948 |
| 2,469,014 | Stalhandske | May 3, 1949 |
| 2,609,209 | Perman | Sept. 2, 1952 |
| 2,885,210 | Sima | May 5, 1959 |
| 2,885,211 | Sima | May 5, 1959 |